(12) United States Patent
Yoshii et al.

(10) Patent No.: US 11,372,976 B2
(45) Date of Patent: Jun. 28, 2022

(54) ACCELERATING METHOD OF SNAPSHOT INVESTIGATION FOR ROLLBACK FROM RANSOMWARE

(71) Applicant: Hitachi, Ltd., Tokyo (JP)

(72) Inventors: Yoshihiro Yoshii, Cupertino, CA (US); Masanori Takada, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 49 days.

(21) Appl. No.: 16/923,489

(22) Filed: Jul. 8, 2020

(65) Prior Publication Data
US 2022/0012337 A1    Jan. 13, 2022

(51) Int. Cl.
  *G06F 21/00*   (2013.01)
  *G06F 21/56*   (2013.01)
  *G06F 12/0891* (2016.01)

(52) U.S. Cl.
  CPC ........ *G06F 21/568* (2013.01); *G06F 12/0891* (2013.01); *G06F 21/562* (2013.01); *G06F 2212/1052* (2013.01); *G06F 2221/034* (2013.01)

(58) Field of Classification Search
  CPC ............... G06F 21/568; G06F 21/562; G06F 2212/1052; G06F 2221/034
  USPC .......................................................... 726/23
  See application file for complete search history.

(56) References Cited

U.S. PATENT DOCUMENTS

| | | | |
|---|---|---|---|
| 6,973,549 B1 * | 12/2005 | Testardi ................. | G06F 9/526 714/E11.13 |
| 8,151,060 B2 * | 4/2012 | Mizushima ......... | G06F 12/1009 711/141 |
| 9,116,846 B2 | 8/2015 | Vasilyev et al. | |
| 9,317,375 B1 * | 4/2016 | Sadhu ................ | G06F 11/1451 |
| 9,575,792 B2 * | 2/2017 | Robinson ............ | G06F 11/1458 |
| 10,725,866 B1 * | 7/2020 | Palaiah ............... | G06F 16/1734 |
| 2006/0248297 A1 * | 11/2006 | Watanabe ........... | G06F 12/0871 711/162 |
| 2007/0185923 A1 * | 8/2007 | Nishikawa .......... | G06F 11/1471 |
| 2009/0094603 A1 * | 4/2009 | Hiltgen ............... | G06F 9/45558 718/1 |
| 2013/0339569 A1 * | 12/2013 | Yochai ................ | G06F 12/0804 711/135 |
| 2016/0248882 A1 * | 8/2016 | Tanaka ................ | H04L 67/025 |
| 2018/0246788 A1 * | 8/2018 | Hatasaki ............. | G06F 11/1451 |
| 2019/0370153 A1 * | 12/2019 | Ono .................... | G06F 11/2048 |

* cited by examiner

*Primary Examiner* — Josnel Jeudy
(74) *Attorney, Agent, or Firm* — Procopio, Cory, Hargreaves & Savitch LLP

(57) ABSTRACT

Example implementations described herein are directed to systems and methods to accelerating the time to identify the latest snapshot that is not infected by malware and swap the snapshot for an underlying volume for a host computer without needing to communicate with the storage administrator of the storage system. In example implementations described herein, an iterative process is utilized to traverse snapshots through a storage plug-in application until such a snapshot is identified. Through the example implementations described herein, such snapshots can be identified quickly in comparison to manual selection.

14 Claims, 5 Drawing Sheets

Volume Restore Table — 220

| Volume ID | Restore Point | Volume Status |
|---|---|---|
| 1000 | 10/20/2019 00:00:00 | Unchecked |
| 1000 | 10/20/2019 12:00:00 | Normal (Checked on 11/20/2019 10:00:00) |
| 1000 | 10/21/2019 00:00:00 | Ransomware Detected (Checked on 11/20/2019 10:00:00) |
| 1000 | 10/21/2019 12:00:00 | Unchecked |
|  |  |  |

Columns: 2201, 2202, 2203

FIG. 4

ACCELERATING METHOD OF SNAPSHOT INVESTIGATION FOR ROLLBACK FROM RANSOMWARE

BACKGROUND

Field

The present disclosure is directed to storage systems, and more specifically, to snapshot investigation for rollback from ransomware.

Related Art

The importance of data protection is increasing against the background of the risk of external attacks such as ransomware. Ransomware is a type of malware that restricts access to the infected computer system in some way and demands that the user pay a ransom to the malware operators to remove the restriction. Some forms of ransomware systematically encrypt files on the storage resources of a system, which become difficult or impossible to decrypt without paying the ransom for the encryption key.

For protecting system from ransomware, it is a common measure to take snapshots frequently in advance and restore from the snapshots if there is a ransomware attack. For example, a system can be set to take snapshots hourly and retain hourly for the past 24 hours, daily for the past month, and weekly for all previous months.

If there is an attack of ransomware and some business applications stop, the business application user is required to restore the system as soon as possible to restart their business. Further, the user is needed to restore from the latest state as possible to reduce the data loss.

The application user must choose what date of snapshot to restore, but it is difficult to know when the business application is infected by ransomware because some ransomware variants have an incubation period. This means that the malicious effects are seen when the user can no longer remember when and where he might have picked up the ransomware. In that case, it is necessary to repeat the process of mounting the snapshot from storage system to host computer→checking if the system is infected by ransomware or not→mounting another snapshot if it is infected. This operation needs to be performed in cooperation between the storage administrator and the application user, which takes time for communication and increases the time to recovery business application.

An example related art implementation mounts a storage snapshot on a backup server, and the backup server itself directly references the file or virtual machine to restore the storage system. However, such implementations require a new backup server which can be expensive.

SUMMARY

Aspects of the present disclosure involve a method for a host computer communicatively coupled to a storage system, the method involving executing, on the host computer, a storage plug-in configured to request the storage system to provide a list of snapshots generated from a volume mounted to the host computer; the host computer receiving, from the storage system, the list of snapshots accessible by the host computer in response to the request; for an issuance of a restore request of the volume to the storage plug-in from the host computer, a) disabling data caching in the host computer for the volume; b) purging cache data in the host computer; and c) after completion of the purging of the cache data in the host computer, requesting the storage system to mount a selected snapshot from the list of snapshots to the host computer, wherein the storage system swaps a snapshot of the volume to the selected snapshot.

Aspects of the present disclosure involve a non-transitory computer readable medium, storing instructions for a host computer communicatively coupled to a storage system, the instructions involving executing, on the host computer, a storage plug-in configured to request the storage system to provide a list of snapshots generated from a volume mounted to the host computer; the host computer receiving, by the storage system, the list of snapshots accessible from the host computer in response to the request; for an issuance of a restore request of the volume to the storage plug-in from the host computer, a) disabling data caching in the host computer for the volume; b) purging cache data in the host computer; and c) after completion of the purging of the cache data in the host computer, requesting the storage system to mount a selected snapshot from the list of snapshots to the host computer, wherein the storage system swaps a snapshot of the volume to the selected snapshot.

Aspects of the present disclosure involve a system for a host computer communicatively coupled to a storage system, the system involving means for executing, on the host computer, a storage plug-in configured to request the storage system to provide a list of snapshots generated from a volume mounted to the host computer; means for receiving, from the storage system, the list of snapshots accessible by the host computer in response to the request; for an issuance of a restore request of the volume to the storage plug-in from the host computer, a) means for disabling data caching in the host computer for the volume; b) means for purging cache data in the host computer; and c) after completion of the purging of the cache data in the host computer, means for requesting the storage system to mount a selected snapshot from the list of snapshots to the host computer, wherein the storage system swaps a snapshot of the volume to the selected snapshot.

Aspects of the present disclosure can involve a host computer communicatively coupled to a storage system, the host computer involving a processor, configured to execute a storage plug-in configured to request the storage system to provide a list of snapshots generated from a volume mounted to the host computer; receive, from the storage system, the list of snapshots accessible by the host computer in response to the request; for an issuance of a restore request of the volume to the storage plug-in from the host computer, a) disable data caching in the host computer for the volume; b) purge cache data in the host computer; and c) after completion of the purge of the cache data in the host computer, request the storage system to mount a selected snapshot from the list of snapshots to the host computer, wherein the storage system swaps a snapshot of the volume to the selected snapshot.

DETAILED DESCRIPTION OF DRAWINGS

FIG. 4 illustrates an example of volume restore point table, in accordance with an example implementation.

DETAILED DESCRIPTION

Figure 1:
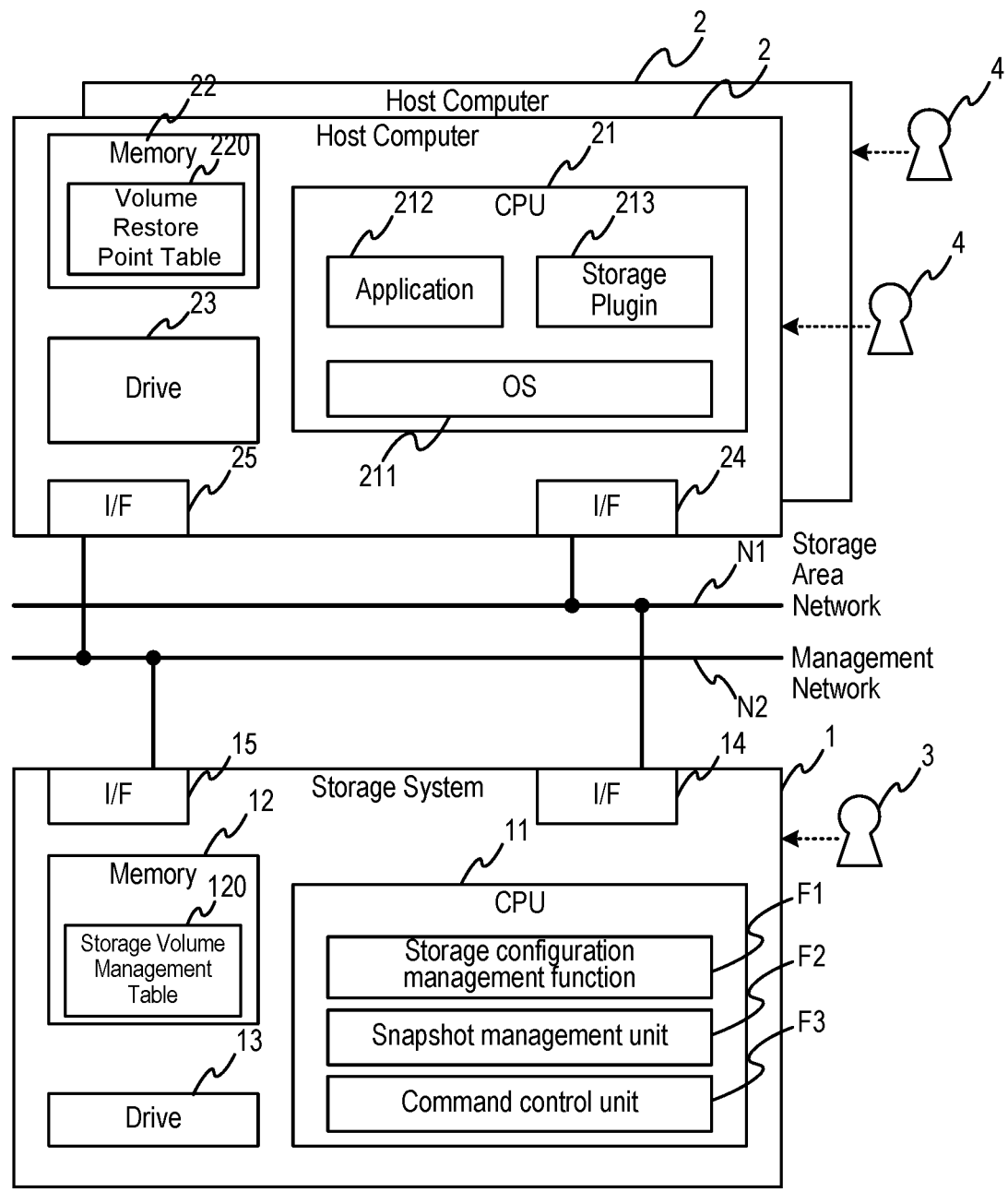
FIG. 1 illustrates a system configuration diagram in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. Malware and ransomware may be utilized interchangeably through the example implementations described herein.

The example implementations described herein are directed to reducing the time that application users use to find the snapshot that is uninfected by malware and the latest data among all of the point-in-time data images taken by a snapshot function of a storage system, and do to do so without requiring communication with the storage administrator.

The snapshot function is a function of creating a point-in-time data image on a storage system under operation when a snapshot is taken and making the point-in-time data image accessible by using means different from the storage under operation. The snapshot function is for salvaging data from operational mistakes such as a case where the user involuntarily deletes a file or when a file is destroyed by ransomware.

The user can restore data at the point in time when a snapshot was created by returning to a snapshot of a desired generation such as a previous generation. That is, the snapshot function is for guaranteeing a data image of a volume as of a certain date and time to the user.

FIG. 1 illustrates a system configuration diagram in accordance with an example implementation. As illustrated in FIG. 1, the system can involve one or more host computers 2. Each of the host computers 2 is used by a corresponding application user 4. Each host computer 2 can include a central processing unit (CPU) 21, memory 22, one or more storage drives 23, network interface (I/F) 24 for the storage network N1 and network I/F 25 for the management network N2. CPU 21 is configured to execute application 212, storage plugin 213 and operating system (OS) 211. As illustrated in FIG. 1, each of the host computers 2 can be communicatively coupled to the storage system 1 through storage network N1 and management network N2.

Storage system 1 is managed by the storage administrator 3. Storage system 1 can involve CPU 11, memory 12, storage drive 13, network I/F for the storage network N1 and network I/F 15 for the management network N2. Memory 12 is configured to manage storage volume management table 120. CPU 11 is configured to execute one or more functions, such as storage configuration management function F1, snapshot management unit F2, and command control unit F3.

CPU 21 can execute storage plug-in 213 which is configured to request the storage system 1 to provide a list of snapshots generated from a volume mounted to the host computer as managed in the storage volume management table 120. CPU 21 can thereby receive from the storage system 1, the list of snapshots accessible by the host computer in response to the request which is processed as volume restore table 220. For an issuance of a restore request of the volume to the storage plug-in from the host computer (e.g., via a user interface from a user), CPU 21 can be configured to a) disable data caching in the host computer for the volume; b) purge cache data in the host computer; and c) after completion of the purging of the cache data in the host computer, requesting the storage system to mount a selected snapshot from the list of snapshots to the host computer, wherein the storage system swaps a snapshot of the volume to the selected snapshot as illustrated at 5104 to 5107 of FIG. 5.

Figure 5:
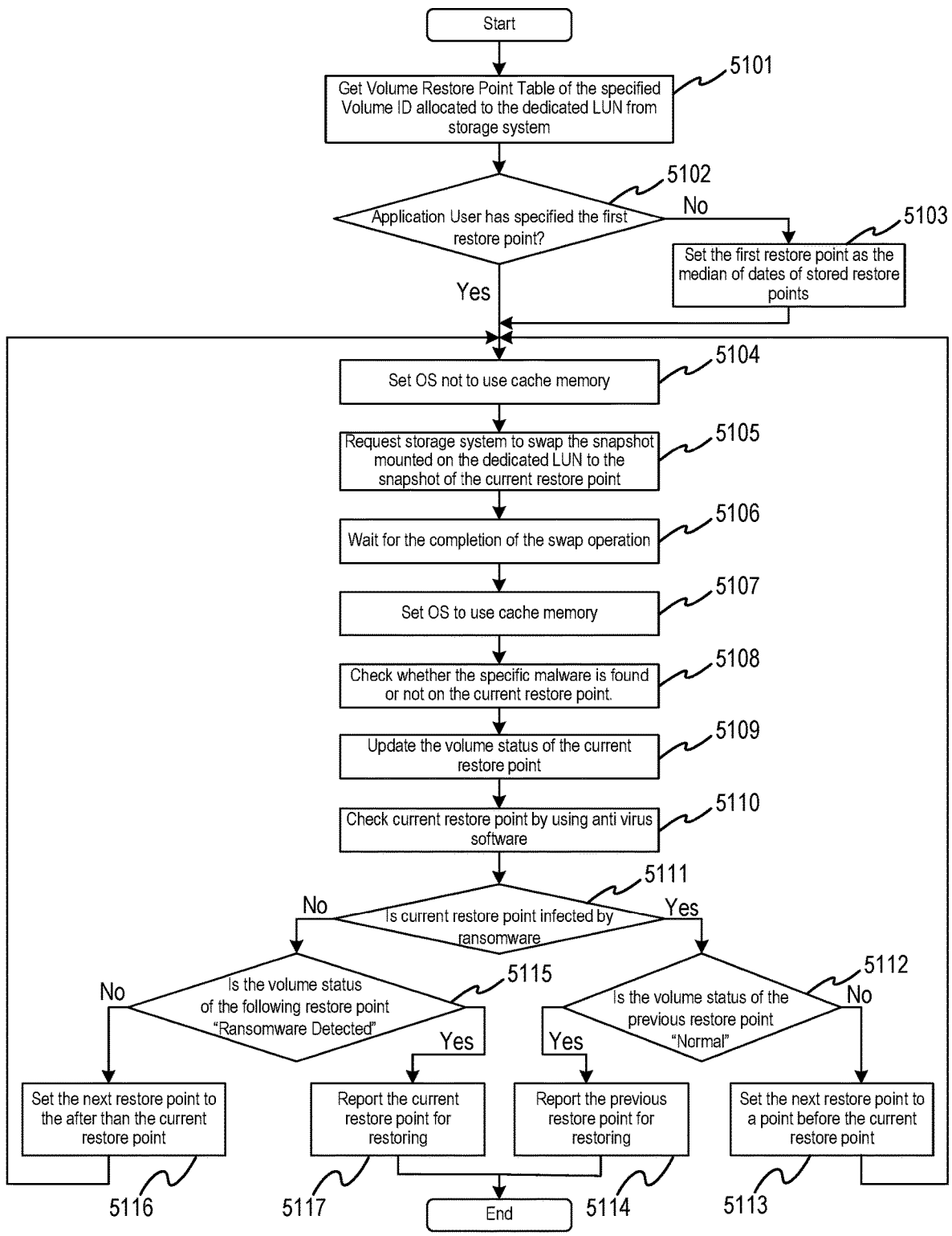
FIG. 5 is a flow diagram illustrating a procedure of getting the Volume Restore Point Table of the specified volume from Storage System, in accordance with an example implementation.

CPU 21 can be configured to, for the issuance of the restore request of the volume to the storage plug-in from the host computer determine whether the volume is infected by malware; for the determination indicative of the volume being infected by malware, updating a status of the volume as being infected by malware; and for the determination indicative of the volume not being infected by malware, updating the status of the volume as being normal as illustrated at 5108 to 5110 of FIG. 5.

CPU 21 can be configured to associate each snapshot in the list of snapshots with a status based on a detection of malware for the each snapshot as illustrated in FIG. 4.

CPU 21 can be configured to, for the issuance of a restore request of the volume to the storage plug-in from the host computer re-enable the data caching in the host computer for the volume; and determine whether the selected snapshot is infected by malware as illustrated at 5107 to 5111 of FIG. 5. For a determination that the selected snapshot is infected by malware, CPU 21 can be configured to determine whether a previously selected snapshot is infected by malware; for the determination that the previously selected snapshot is infected by malware, selecting another snapshot from the list of snapshots that is earlier than the selected snapshot and re-iterating a) to c) with the another snapshot; and for the determination that the previously selected snapshot is not infected by malware, restoring the volume from the previously selected snapshot as illustrated at 5111 to 5114 of FIG. 5.

For the issuance of a restore request of the volume to the storage plug-in from the host computer, CPU 21 can be configured to re-enable the data caching in the host computer for the volume; determine whether the selected snapshot is infected by malware; for a determination that the selected snapshot is not infected by malware, determine whether a later snapshot from the list of snapshots is infected by malware as illustrated at 5107 to 5111 of FIG. 5. For the determination that the later snapshot is infected by malware, CPU 21 can be configured to restore the volume from the selected snapshot; and for the determination that the later snapshot is not infected by malware; selecting another snapshot from the list of snapshots that is later than the selected snapshot and re-iterating a) to c) with the another snapshot as illustrated at 5115 to 5117 of FIG. 5.

Depending on the desired implementation, the selected snapshot can be conducted through a user selection if the user is aware of a snapshot that does not have malware as illustrated at 5102 of FIG. 5.

Depending on the desired implementation, the selected snapshot can be conducted through instructing the storage system to select the selected snapshot as illustrated at 5103 of FIG. 5.

Figure 2:
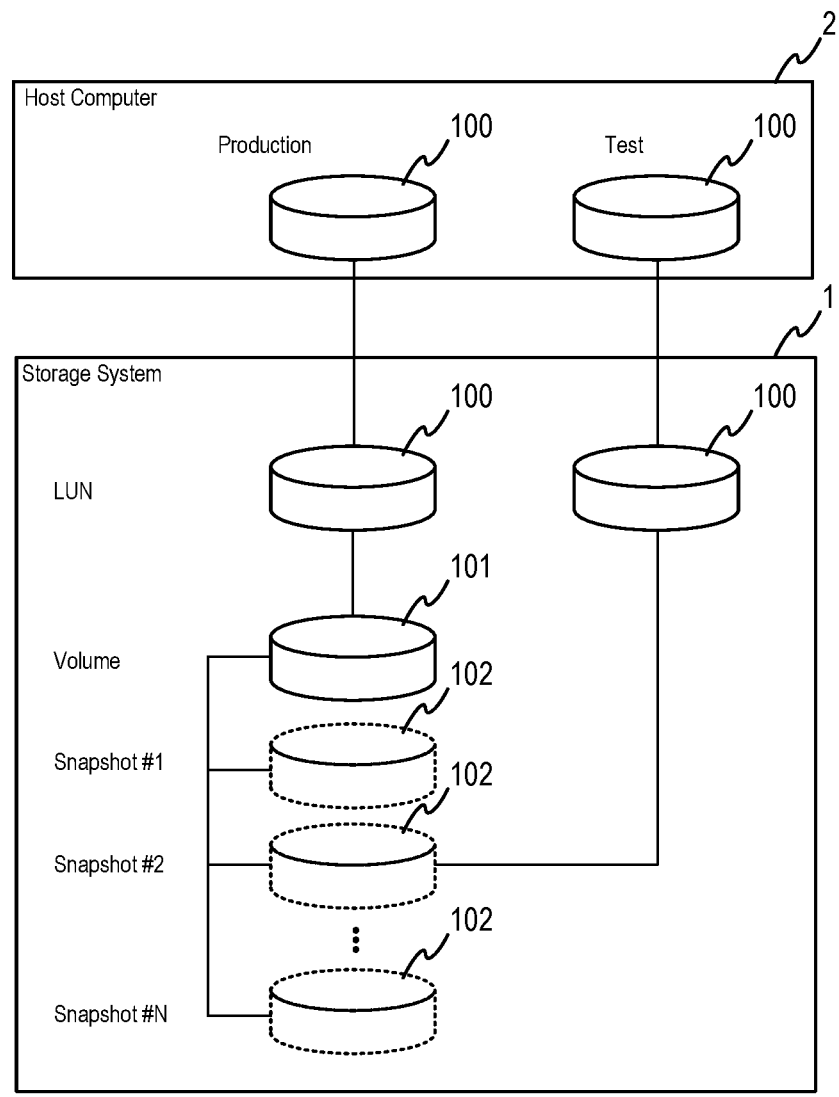
FIG. 2 illustrates a block diagram for an example a configuration of a storage volume, in accordance with an example implementation.

FIG. 2 illustrates a block diagram for an example a configuration of a storage volume, in accordance with an example implementation. As illustrated in FIG. 2, the storage system 1 manages a plurality of volumes 101 and snapshots 102. The storage system 1 maps the volume 101 or snapshot 102 with the logical unit number (LUN) 100, so that the host 2 can access the volume 101 or snapshot 102. The storage system 1 can switch the snapshot 102 mounted on the LUN 100 to a snapshot 102 of any generation.

Figure 3:
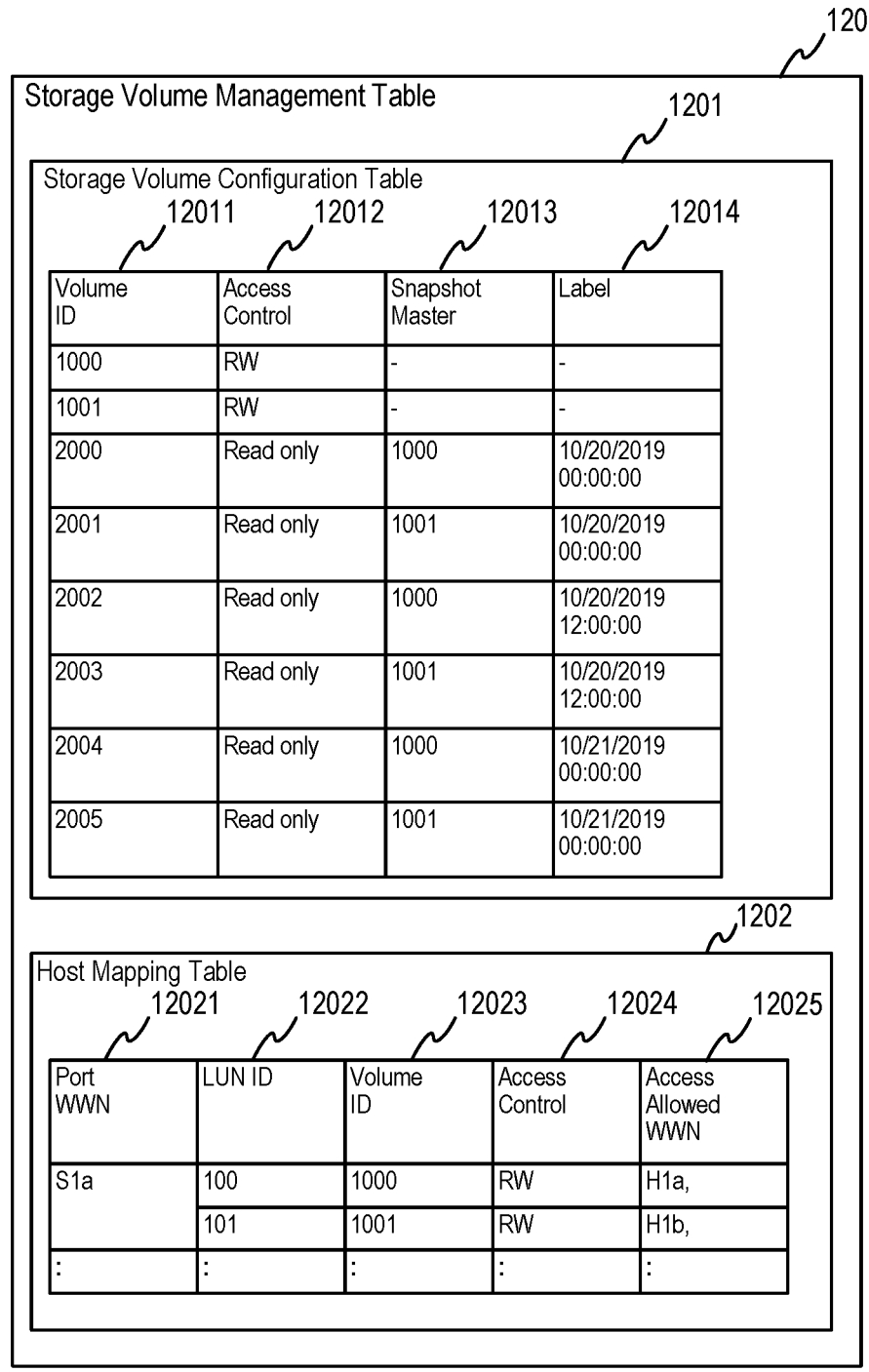
FIG. 3 illustrates an example of storage volume management table, in accordance with an example implementation.

FIG. 3 illustrates an example of storage volume management table, in accordance with an example implementation. The storage volume management table 120 contains Storage Volume Configuration Table 1201 and Host Mapping Table 1202. These tables are stored in and managed by a storage system 1.

Storage Volume Configuration Table 1201 is information about a storage volume provided to the host computer 2 by the storage system 1. Such storage volume information can involve the following. "Volume ID" 12011 is a unique internal management ID. "Access Control" 12012 indicates if the storage volume is read-only, or can facilitate read/write (RW) access. "Snapshot Master" 12013 indicates from which Volume ID it has been replicated when the volume is a snapshot volume created from a specific Volume. "Label" 12014 is information indicating when the snapshot was taken.

As shown in the figure, Host Mapping Table 1202 includes a port WWN (World Wide Name) 12021 of an interface (I/F) port that storage system has, a LUN ID 12022, and a Volume ID 12023 assigned to the port. "Access Control" 12024 represents whether or not I/O from the host computer is accessible to the volume.

For example, "RW" indicates that host computer 2 is able to read and write to the volume. "Read Only" indicates that host computer 2 is only able to read. In order to prohibit write operations from ransomware attacks, it can be necessary to suppress write operations. The Access Allowed WWN of the access source port permitted to access the volume is registered at the Access Allowed WWN field 12025.

FIG. 4 illustrates an example of volume restore point table, in accordance with an example implementation. This table 130 is created by storage plugin. This table is stored on host memory 220. Volume ID 2201 is a unique internal management ID. Restore Point 2202 is information indicating point-in-time data image of storage volume stored in the storage system as a snapshot. Storage plugin get Restore Point related to the Volume ID 2201 from the storage system. Volume Status 2203 is information to manage volume status. Initially, all entries are set "unchecked". After storage plugin checks the volume status as illustrated in FIG. 5, the storage plugin upgrades this entry.

FIG. 5 is a flow diagram illustrating a procedure of getting the Volume Restore Point Table of the specified volume from Storage System, in accordance with an example implementation. Such a procedure can be invoked when the storage plug-in executes a volume restore operation as received from a user interface of the host computer.

At 5101, the process obtains the Volume Restore Point Table of the specified Volume ID allocated to the dedicated LUN from the storage system. At 5102, a determination is made as to whether the application user has specified the first restore point (e.g., through a user interface provided through the host computer). If so (Yes) then the process proceeds to 5104, otherwise (No) the process proceeds to 5103 to set the first restore point as the median of dates stored restore points 2202. Although the median is used in the example implementation, other implementations can be utilized depending on the desired implementation, such as selecting the previous restore point, selecting a point at random, and so on.

At 5104, the process configures the OS 211 not to use cache memory. In the example implementations, the data caching is disabled for the host computer as the application running on the host computer may otherwise crash if the cache data is inconsistent with what is expected. Thus, the data caching is disabled until the volume is swapped to the selected snapshot and mounted before re-enabling the data caching to avoid such potential crashes. During this process, the cache of the host computer is purged/invalidated to avoid any inconsistencies between the OS and the application.

At 5105 the process requests the storage system to swap the snapshot mounted on the dedicated LUN to the snapshot of the current restore point. At 5106 the process waits for the completion of the swap operation. At 5107 the process sets the OS to resume use of the cache memory once the swap is completed.

At 5108 a check is made as to whether the specific malware is found or not on the current restore point. In example implementations of ransomware, such a check can be conducted by determining whether or not the files of the snapshot are encrypted or the system is locked out from executing OS files. Such an initial check can be quickly conducted for checking for ransomware, as ransomware typically encrypts files to lock the user from using the snapshot. In another example implementation, a check can be performed for the existence of a known malware or ransomware file as determined from the current volume. At 5109 the process updates the volume status of the current restore point. For example, if it is determined that the files are all encrypted or the system is locked out from accessing the OS files, then the volume status 2203 of the snapshot can be changed to "ransomware detected".

At 5110 a check is performed on the current restore point through using antivirus software. After the check is performed on the current restore point through using antivirus software, the volume status 2203 of the snapshot can be changed to "normal" or "malware detected" based on the determination from the antivirus software, or if ransomware was detected from the initial check at 5108 then the status can be retained as "Ransomware detected". At 5111, a determination is made as to whether the current restore point is infected by ransomware/malware as indicated by the checks at 5108 and 5111. If so (Yes), then the flow proceeds to 5112, otherwise (No), the flow proceeds to 5115.

At 5112, it has been determined that the current restore point is infected by ransomware. Accordingly, a check is performed as to whether the volume status of the previous restore point is "Normal". If so (Yes), then the process proceeds to 5114 to report the previous restore point for use in the restoring process. Otherwise (No), the process proceeds to 5113 to set the next restore point to a point before the current restore point and proceeds back to 5104.

At 5115, it has been determined that the current restore point is not infected by ransomware. Accordingly, a check is performed as to whether the volume status of the following restore point is "Ransomware Detected" (e.g., ransomware was detected in that restore point).

Through the iterative process as illustrated in FIG. 5, the available restore points can be traversed until an appropriate and latest restore point unaffected by ransomware can be found and utilized.

Through the example implementations described herein, application users can thereby accelerate the time required to find the restore point uninfected by malware and the latest snapshot among a myriad of snapshots made by a storage system. Application users can thereby utilize such example implementations without any requirement to communicate with the storage administrator through cooperation between the storage plugin on application server, operating system on the application server and the storage system.

Example implementations described herein can involve a storage plug-in that runs on the host computer and requests the storage system to acquire a list of snapshots that created from the volume that mounted to the hosts. The storage system that provides a list of snapshots can be accessible from the host in accordance with the request from storage plug-in. When the plug-in receives a restore request from the host computer, the plug-in disables the cache function for the host computer of the restore target volume, and the cached data is purged. After the cache purge operation is complete, the storage plug-in requests the storage system to mount the snapshot to the host. The storage system swaps the snapshot to be restored to a previously mounted volume non-disruptively.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a host computer communicatively coupled to a storage system, the method comprising:
   executing, on the host computer, a storage plug-in configured to request the storage system to provide a list of snapshots generated from a volume mounted to the host computer;
   the host computer receiving, from the storage system, the list of snapshots accessible by the host computer in response to the request;
   for an issuance of a restore request of the volume to the storage plug-in from the host computer:
   a) disabling data caching in the host computer for the volume;
   b) purging cache data in the host computer; and
   c) after completion of the purging of the cache data in the host computer, requesting the storage system to mount a selected snapshot from the list of snapshots to the host computer, wherein the storage system swaps a snapshot of the volume to the selected snapshot.

2. The method of claim 1, further comprising, for the issuance of the restore request of the volume to the storage plug-in from the host computer:

determining whether the volume is infected by malware;
for the determination indicative of the volume being infected by malware, updating a status of the volume as being infected by malware;
for the determination indicative of the volume not being infected by malware, updating the status of the volume as being normal.

3. The method of claim 1, further comprising associating each snapshot in the list of snapshots with a status based on a detection of malware for the each snapshot.

4. The method of claim 1, further comprising, for the issuance of a restore request of the volume to the storage plug-in from the host computer:
re-enabling the data caching in the host computer for the volume;
determining whether the selected snapshot is infected by malware;
for a determination that the selected snapshot is infected by malware:
determining whether a previously selected snapshot is infected by malware;
for the determination that the previously selected snapshot is infected by malware, selecting another snapshot from the list of snapshots that is earlier than the selected snapshot and re-iterating a) to c) with the another snapshot; and
for the determination that the previously selected snapshot is not infected by malware, restoring the volume from the previously selected snapshot.

5. The method of claim 1, further comprising, for the issuance of a restore request of the volume to the storage plug-in from the host computer:
re-enabling the data caching in the host computer for the volume;
determining whether the selected snapshot is infected by malware;
for a determination that the selected snapshot is not infected by malware:
determining whether a later snapshot from the list of snapshots is infected by malware;
for the determination that the later snapshot is infected by malware, restoring the volume from the selected snapshot; and
for the determination that the later snapshot is not infected by malware;
selecting another snapshot from the list of snapshots that is later than the selected snapshot and re-iterating a) to c) with the another snapshot.

6. The method of claim 1, further comprising selecting the selected snapshot through a user selection.

7. The method of claim 1, further comprising instructing the storage system to select the selected snapshot.

8. A non-transitory computer readable medium, storing instructions for a host computer communicatively coupled to a storage system, the instructions comprising:
executing, on the host computer, a storage plug-in configured to request the storage system to provide a list of snapshots generated from a volume mounted to the host computer;
the host computer receiving, from the storage system, the list of snapshots accessible by the host computer in response to the request;
for an issuance of a restore request of the volume to the storage plug-in from the host computer:
a) disabling data caching in the host computer for the volume;
b) purging cache data in the host computer; and
c) after completion of the purging of the cache data in the host computer, requesting the storage system to mount a selected snapshot from the list of snapshots to the host computer, wherein the storage system swaps a snapshot of the volume to the selected snapshot.

9. The non-transitory computer readable medium of claim 8, the instructions further comprising, for the issuance of the restore request of the volume to the storage plug-in from the host computer:
determining whether the volume is infected by malware;
for the determination indicative of the volume being infected by malware, updating a status of the volume as being infected by malware;
for the determination indicative of the volume not being infected by malware, updating the status of the volume as being normal.

10. The non-transitory computer readable medium of claim 8, the instructions further comprising associating each snapshot in the list of snapshots with a status based on a detection of malware for the each snapshot.

11. The non-transitory computer readable medium of claim 8, the instructions further comprising, for the issuance of a restore request of the volume to the storage plug-in from the host computer:
re-enabling the data caching in the host computer for the volume;
determining whether the selected snapshot is infected by malware;
for a determination that the selected snapshot is infected by malware:
determining whether a previously selected snapshot is infected by malware;
for the determination that the previously selected snapshot is infected by malware, selecting another snapshot from the list of snapshots that is earlier than the selected snapshot and re-iterating a) to c) with the another snapshot; and
for the determination that the previously selected snapshot is not infected by malware, restoring the volume from the previously selected snapshot.

12. The non-transitory computer readable medium of claim 8, the instructions further comprising, for the issuance of a restore request of the volume to the storage plug-in from the host computer:
re-enabling the data caching in the host computer for the volume;
determining whether the selected snapshot is infected by malware;
for a determination that the selected snapshot is not infected by malware:
determining whether a later snapshot from the list of snapshots is infected by malware;
for the determination that the later snapshot is infected by malware, restoring the volume from the selected snapshot; and
for the determination that the later snapshot is not infected by malware;
selecting another snapshot from the list of snapshots that is later than the selected snapshot and re-iterating a) to c) with the another snapshot.

13. The non-transitory computer readable medium of claim 8, the instructions further comprising selecting the selected snapshot through a user selection.

14. The non-transitory computer readable medium of claim 8, the instructions further comprising instructing the storage system to select the selected snapshot.

\* \* \* \* \*